United States Patent [19]
Antles, II

[11] Patent Number: 5,327,121
[45] Date of Patent: Jul. 5, 1994

[54] THREE LINE COMMUNICATIONS METHOD AND APPARATUS

[75] Inventor: Thomas L. Antles, II, Spokane, Wash.

[73] Assignee: Hewlett-Packard Company, Palo Alto, Calif.

[21] Appl. No.: 998,899

[22] Filed: Dec. 28, 1992

Related U.S. Application Data

[63] Continuation of Ser. No. 612,025, Nov. 9, 1990, abandoned.

[51] Int. Cl.$^5$ .............................................. H04Q 1/00
[52] U.S. Cl. ........................... 340/825.51; 340/825.06; 340/825.12
[58] Field of Search ................. 340/825.06, 825.07, 340/825.08, 825.12, 825.2, 825.51, 825.52, 825.54, 825.65; 370/29, 85.11; 375/107

[56] References Cited

U.S. PATENT DOCUMENTS

| | | | |
|---|---|---|---|
| 4,313,196 | 1/1982 | Oblonsky | 370/85.11 |
| 4,404,672 | 9/1983 | Shimizu | 370/29 |
| 4,644,348 | 2/1987 | Gerety | 340/825.06 |
| 4,669,079 | 5/1987 | Blum | 370/85.11 |
| 4,779,093 | 10/1988 | Watkins | 340/825.2 |
| 4,885,578 | 12/1989 | Perry et al. | 340/825.52 |

*Primary Examiner*—Donald J. Yusko
*Assistant Examiner*—Edwin C. Holloway, III

[57] ABSTRACT

A communications scheme is provided whereby each of a plurality of I/O devices is connected to a system controller via three lines: a bidirectional data bus, a clock bus, and a bidirectional enable/interrupt line. The enable/interrupt lines serve the dual-purpose of carrying interrupt signals from an I/O device to the system controller and carrying enable signals from the system controller to the I/O device. To avoid conflict on an enable/interrupt line, an I/O device may send an interrupt only while the clock signal is at a first level. When the clock signal is at a second level, the I/O device is required to monitor its enable/interrupt line for an enable signal from the system controller.

20 Claims, 3 Drawing Sheets

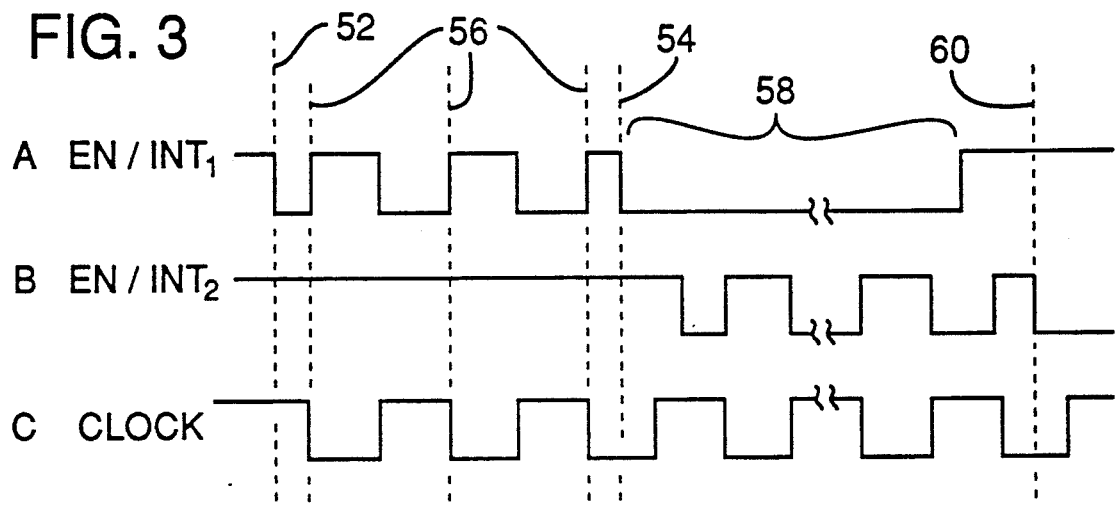
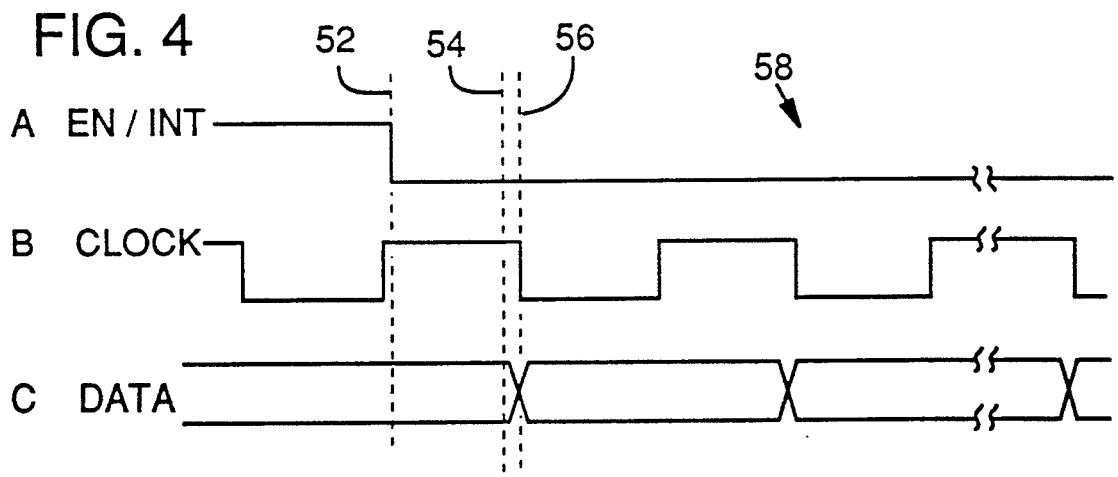

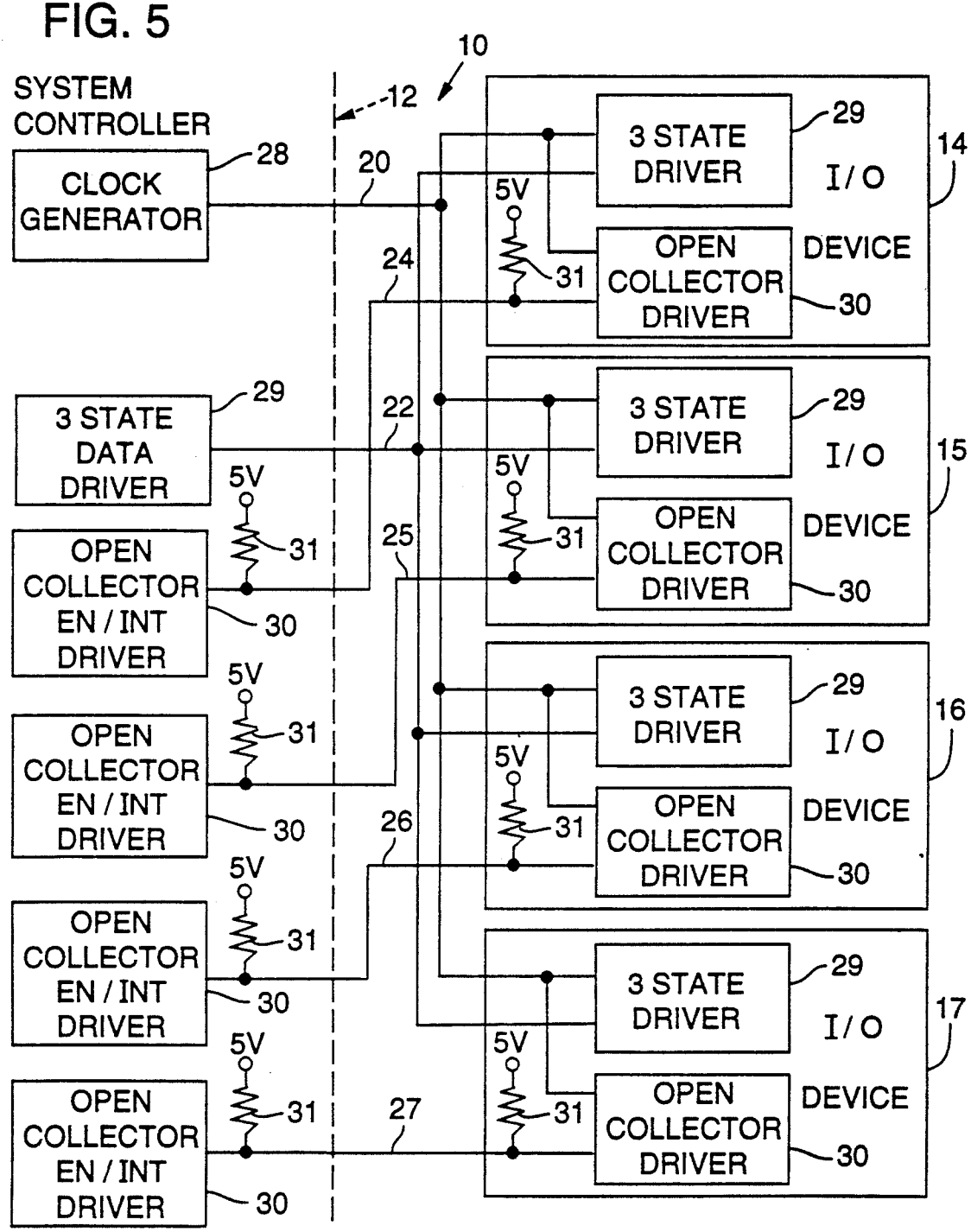

THREE LINE COMMUNICATIONS METHOD AND APPARATUS

CROSS REFERENCE TO RELATED APPLICATION

This is a continuation of copending application Ser. No. 07/612,025 filed on Nov. 9, 1990, now abandoned.

FIELD OF THE INVENTION

The present invention relates to data communications systems and, more particularly, relates to a sparse network for communicating between a master device and a plurality of slave devices.

BACKGROUND AND SUMMARY OF THE INVENTION

In a system for transferring data between digital electronic devices, one of the devices is typically responsible for controlling data transfers and is designated the system controller, or master, while other devices in the system operate in conjunction with the master and are termed slaves. For expository convenience, the present invention is illustrated with reference to slaves that are I/O devices, although it will be recognized other types of slave devices may of course be used.

In most prior art systems, the system controller and the I/O devices are interconnected with a number of common buses. These buses typically include an address bus, an enable bus, a data bus, a clock bus, a read bus, a write bus, and one or more interrupt lines. Data transfer is controlled by the system controller through signals sent on these buses.

For example, when data is written from the system controller to an I/O device, the system controller is required to provide the address of the I/O device to the address bus, an enable signal to the enable bus, and a write signal to the write bus before sending data on the data bus in synchronization with a clock signal on the clock bus. The signal on the address bus serves to identify the I/O device to which the data is to be transferred. The address bus often comprises plural wires.

When reading information from an I/O device, the system controller again places the address of the device on the address bus while applying an enable signal to the enable bus and a read signal to the read bus. The system controller then reads information placed on the data bus by the addressed I/O device in synchronization with a clock signal on the clock bus.

Data transfer may also be initiated by an I/O device. When a data transfer is initiated by an I/O device, the I/O device applies an interrupt request signal to an interrupt line and the system controller services the request by determining which device generated the interrupt request and completing the requested read or write operation as described above.

One significant disadvantage of the prior art described above is the large number of wires required to connect an I/O device to the system. The I/O circuitry of an I/O device is typically realized as an integrated circuit. Each wire connected to an integrated circuit requires a separate pin and a pad on the chip. Each pad consumes a very large area of the chip compared to the area required for other discrete logic elements. Thus, each additional pad severely limits the amount of logic elements that may be placed on the chip, and consequently limits the complexity and functionality of the circuit. Also, the size of the circuit package is determined by the number of pins: the greater the number of pins, the larger the chip package. It is therefore advantageous to minimize the number of wires required to connect the I/O device to the system.

A further disadvantage results from the requirement of identifying the subject I/O device through a coded address sent on an address bus. The number of address code combinations is limited by the number of addressing pins that have been provided on the I/O circuit of the I/O device. The number of different address codes available, and hence the number of allowable I/O devices in the system, is two to the nth power, where n is the number of dedicated address pins. Many systems are therefore limited in the number of I/O devices allowed in the system by the number of address pins provided in the I/O devices.

In accordance with the present invention, a communications/control scheme is provided wherein each I/O device is connected to the system controller via three lines. One of the lines is a bidirectional enable/interrupt line connecting the I/O device to the system controller. The enable/interrupt line conveys both an enable signal to the I/O device and an interrupt request to the system controller. The remaining two wires are bussed lines that connect to all I/O devices and the system controller. One of the lines is a data bus for conveying data between the I/O devices and the system controller. The other is a clock bus for conveying a synchronizing signal for synchronizing serial data transmission. By this arrangement, a sparse control/communications network is provided that can accommodate an arbitrarily large number of I/O devices without a commensurate increase in the number of lines provided to each I/O device.

The foregoing and additional features and advantages of the present invention will be more readily apparent from the following detailed description thereof, which proceeds with reference to the accompanying drawings.

BRIEF DESCRIPTION OF THE DRAWINGS

FIG. 3 is a waveform diagram showing a procedure for sending and servicing interrupt requests in accordance with the present invention including resolving contentions between an I/O device, the system controller, and a second I/O device.

FIG. 4 is a waveform diagram of a method for resolving contention on the enable/interrupt line between an interrupting I/O device and the system controller starting a data transfer.

FIG. 5 is a block diagram of line drivers in the system of FIG. 1.

DETAILED DESCRIPTION

Figure 1:
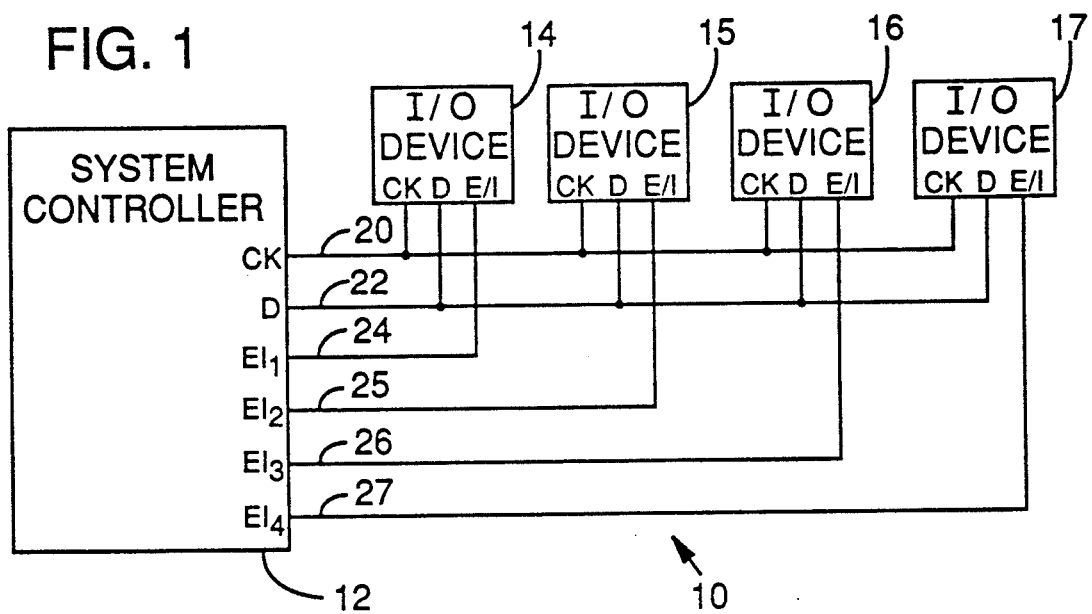
FIG. 1 is a block diagram of a system comprising multiple digital electronic devices connected for serial communication in accordance with one embodiment of the present invention.

With reference to FIGS. 1 and 5 an illustrative serial communications system 10 embodying the present invention includes a system controller 12 and a plurality of I/O devices 14–17. Each I/O device is connected for communication with the system via three lines: a clock bus 20, a data bus 22, and an enable/interrupt line, lines 24-27 respectively.

In the embodiment illustrated in FIG. 1, there are four I/O devices. It will be recognized however, that a system embodying the present invention may have any number of I/O devices. Each additional I/O device is simply connected to the clock bus 20 and the data bus 22. Additional I/O devices must also be provided a separate enable/interrupt line in the same manner that I/O devices 14-17 have been provided separate enable/interrupt lines 24-27. In this manner, the number of lines in the system is minimized and is equal to the number of I/O devices plus two.

The clock bus 20 is a single wire line. In the illustrated embodiment, it is driven by the system controller 12. However, the clock signal may instead be supplied by a separate oscillator 28 or its equivalent. The clock signal is used to synchronize data transfer operations in the manner described below.

The data bus 22, in the illustrated embodiment, is also a single wire line. Unlike the clock bus, however, the data bus is bi-directional. In other words, both the system controller 12 and the various I/O devices 14-17 drive the line at different times. In order to have multiple drivers 29 connected to the single data bus, the data bus drivers 29 are desirably tri-state totem pole drivers or their equivalent.

The enable/interrupt lines 24-27 are also bidirectional. An enable/interrupt line can be driven by the system controller 12 to enable a specific I/O device for communication on the data bus 22. The line can also be driven by an I/O device to send an interrupt signal to the system controller when the I/O device is initiating communication. While the data bus is driven by synchronous signals and may thus be tri-stated to avoid being driven by conflicting signals, the interrupt and enable signals are asynchronous. To avoid a conflict between an interrupt signal from an I/O device and an enable signal from the system controller to that device, the enable/interrupt line is desirably driven by an open collector driver 30 and pull-up resistor 31 arrangement or the equivalent. The pull-up resistor holds the line at a "high" state when not in use. The open collector drivers allow the system controller, the I/O device, or both to drive the line to a "low" state at any time.

Figure 2:
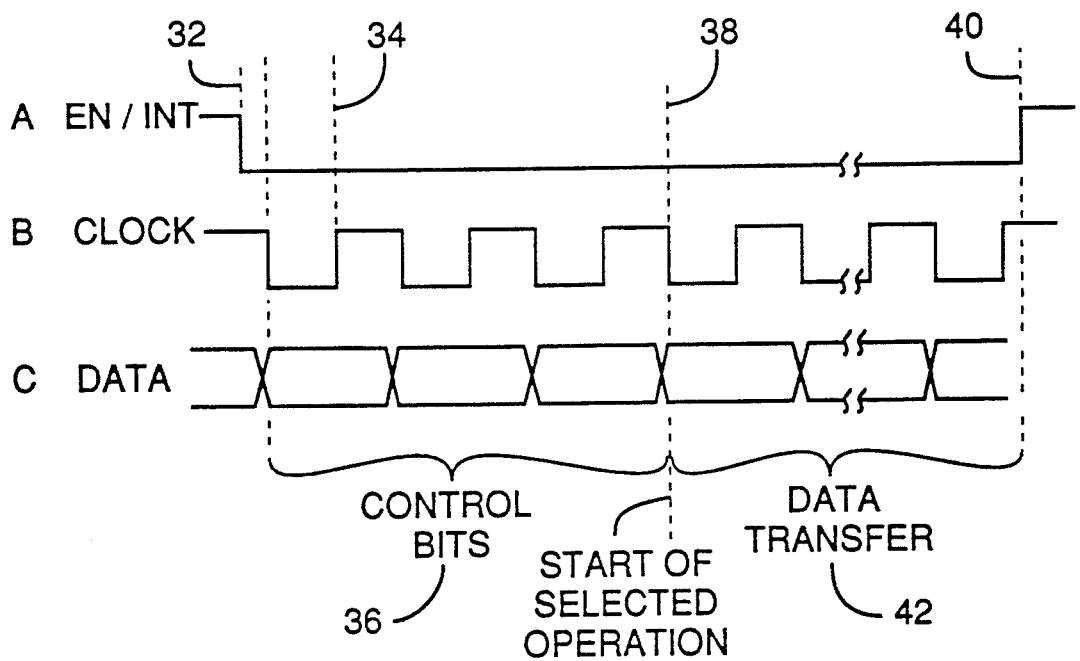
FIG. 2 is a waveform diagram illustrating a typical data transfer operation between the system controller and an I/O device in the system of FIG. 1.

A typical data transfer operation is illustrated by the waveforms of FIG. 2. The data transfer begins when the system controller 12 drives an enable/interrupt line "low," as indicated in the figure by numeral 32. On successive rising edges of the clock signal, indicated by the numeral label 34, control bits 36 are placed on the data bus by system controller 12.

The control bits 36 are a code that indicates to the enabled I/O device which operation is to be performed. The I/O devices of the system will generally be capable of performing two operations: reads and writes. The choice of read or write operation may be expanded to also indicate a source to or from which the I/O device will direct the transferred data. For example, a particular I/O device may be capable of directing incoming serial data from the system controller either serially into a buffer or in parallel to a RAM memory. Additional codes could then be provided in that system to indicate whether a serial write or parallel write is to be performed by the I/O device. The number of control bits that will be sent in a particular embodiment of the invention should be large enough to provide the required number of binary codes for the number of operations that I/O devices in the system may be directed to perform.

After the control bits are sent to the I/O device, the data bus is used for data transfer and the selected operation begins. In FIG. 2, the beginning of the selected operation is indicated by the numeral 38. If the selected operation is a write, the system controller continues to drive the data bus to serially transfer the data bits in synchronization with the clock signal. Otherwise, the selected operation is a read and the system controller must tri-state or disable its data bus driver before the falling edge of the clock signal coincident with the beginning of the selected operation 38. With the system controller's data bus driver tri-stated, the selected I/O device's data bus driver may begin driving the data bus with serial data synchronized to the clock signal. At the completion 40 of the data transfer 42, the controller returns the enable/interrupt line to its "high" state.

The present invention also includes a method for resolving conflicts on the enable/interrupt line. A conflict is possible since both interrupts and enable signals are represented on the enable/interrupt line by driving the line "low." More explicitly, an I/O device, such as I/O device 14 of FIG. 1, that wants to initiate a data transfer sends an interrupt to the system controller 12 by driving enable/interrupt line 24 to "low." Then, in order to service the interrupt request, system controller 12 must enable I/O device 14 by also driving enable/interrupt line 24 to "low" before beginning the data transfer. Since the I/O device 14 is already driving enable/interrupt line 24 to "low," it will not also be able to detect that the system controller 12 is also driving the line.

This conflict is resolved by requiring the I/O device to cease driving its enable/interrupt line while the clock signal is "low." This method is illustrated by the waveforms of FIG. 3 and 4. An I/O device, such as I/O device 14 of FIG. 1, begins an interrupt request signal by driving enable/interrupt line 24 "low." In FIGS. 3 and 4, this occurs at the time marked by numeral 52. When system controller 12 is able to service the interrupt request, it will enable I/O device 14 by also driving enable/interrupt line 24 to "low." This occurs at the time marked 54. Whenever the signal on clock bus 20 goes to "low," I/O device 14 will cease driving enable/interrupt line 24 to "low" to determine if system controller 12 is also driving enable/interrupt line 24 to "low." The process occurs at the times marked 56. In this manner, I/O device 14 is able to determine when system controller 12 is servicing its interrupt request. Once enable line 24 and clock bus 20 are both "low," a data transfer operation similar to that illustrated by FIG. 2 can occur during the time period marked 58.

If, when the system controller 12 is holding a slave's enable/interrupt line 24 low during a data transfer operation, the slave wishes to signal an interrupt to the master, the slave buffers the interrupt until the line 24 is returned high by the master. At that time, the slave can assert its interrupt by pulling the line back low.

The present invention also provides for resolving contention between two I/O devices with concurrent interrupt requests. This process is illustrated in FIG. 3 by the waveform labeled B. System controller 12 simply proceeds to service the first or higher priority interrupt while the second I/O device is left waiting. As previously described, this second I/O device will cease driving its enable/interrupt line while the clock signal s "low" to detect the system controller's enable signal.

This produces a signal on the enable/interrupt line which is the inverse of the clock signal, see FIG. 3, waveform B, during time period 58. After the first I/O device is serviced, system controller 12 will proceed to enable and service the second I/O device. In FIG. 3, waveform B, this occurs at the time marked by numeral 60.

Having described the principles of the present invention with reference to an illustrated embodiment, it will be apparent that the invention can be modified in arrangement and detail without departing from such principles. For example, while the invention has been illustrated with reference to an embodiment in which the data transfer is accomplished serially over a single wire 22, in alternative embodiments, the data transfer can be accomplished in parallel by providing a multi-wire bus instead.

In view of the many possible embodiments to which the principles of my invention may be put, it should be recognized that the detailed embodiment is illustrative only and should not be taken as limiting the scope of my invention. Rather, I claim as my invention all such embodiments as may come within the scope and spirit of the following claims and equivalents thereto.

I claim:

1. A communications system for bidirectional data transfer between a master and a plurality of slaves comprising:
    a bidirectional data bus connected to the master and each slave for transferring data between the master and the slaves;
    a clock bus connected to the master and each slave for synchronizing data transfer operations;
    a plurality of bidirectional enable/interrupt lines for intermittently transmitting interrupt request signals generated by the slaves to the master on, and for transmitting enable signals generated by the master to the slaves, each enable/interrupt line connecting the master to one of the slaves, the slaves driving the enable/interrupt lines with interrupt request signals in synchrony with a clock signal on the clock bus, and first asserting the interrupt request signals asynchronously with respect to edge transitions of the clock signal.

2. The communications system of claim 1 in which the data bus comprises a single wire for serial data transfer.

3. The communications system of claim 2 wherein a number of lines interconnecting the master and the slaves including the data bus, the clock bus, and the enable/interrupt lines is equal to the number of slaves plus two, and each slave is connected to the master via three lines.

4. The communications system of claim 2 wherein the system includes means operable to hold the enable/interrupt line at a first level when not in use, and in which the master and slave each include driving means for driving the enable/interrupt line corresponding thereto to a second level to initial communications therebetween.

5. The communications system of claim 4 wherein the driving means included in the master includes an open collector driver and a pull-up resistor.

6. The apparatus of claim 1 wherein the master generates the clock signal, the master holding the clock signal to a first clock signal level when any of the slaves first asserts the interrupt request signals, and oscillating the clock signal between the first clock signal level and a second clock signal level while the slaves intermittently transmit interrupt request signals and while the master and the slaves transfer data.

7. A method of communicating between a master and a slave in a system comprising the master and a plurality of slaves, wherein each slave is connected to the master via three signal lines, the method comprising:
    holding a first of said three lines at a first signal level when not in use;
    intermittently driving the first line to a second signal level by the slave when the slave originates a data exchange in synchronization with a clock signal on the third line, to thereby interrupt the master, the slave first driving the first line to a second signal level asynchronously with respect to edge transitions of a clock signal on the third line;
    continuously driving the first line to the second signal level by the master to thereby initiate communication; and
    exchange data between the master and the slave on the second line in synchronization with the clock signal.

8. The method of claim 7 in which the exchanging step comprising exchanging data serially between the master and the slave on the second line.

9. The method of claim 8 wherein the step of exchanging data on the second line includes sending control bits from the master to the slave to indicate which of a plurality of read and write operations is to be performed.

10. The method of claim 8 including a method for resolving conflicts between the master and a slave, comprising:
    allowing the slave to drive the first line to the second signal level only when the third line is at a first clock signal level;
    ceasing by the slave to drive the first line to the second signal level when the third line is at a second clock signal level; and
    driving the first line to the second signal level by the master while the third line is at the second clock signal level to thereby initiate communications.

11. The method of claim 7 further comprising holding the third line to a first clock signal level when not exchanging signals and data between the master and the slave.

12. A communications system comprising a master and a plurality of slaves wherein each slave is connected to the master through first, second and third lines and the master is connected to the plurality of slaves through a number of lines equal to the number of the slaves plus two, and wherein each slave includes means for intermittently applying an interrupt signal to the first line in synchrony with a clock signal on the second line, said means first applying the interrupt signal to the first line asynchronously with respect to edge transitions of the clock signal.

13. The communications system of claim 12 wherein the second and third lines are bussed lines common to all slaves and the first line is a dedicated wire connecting only one slave to the master.

14. The communications system of claim 13 wherein the two bussed lines are a unidirectional clock bus and a bidirectional data bus.

15. The communications system according to claim 13 wherein the dedicated wire is a bidirectional enable/interrupt line.

16. The communications system according to claim 15 wherein the bidirectional enable/interrupt line is driven by an open collector driver and a pull-up resistor.

17. A communications/control method for a system comprised of a method device and a plurality of slave devices, wherein the method includes connecting each slave device to the master device by a single wire, and transferring both enable signals from the master to a slave and interrupt request signals from the slave to the master, over said same single wire wherein transferring interrupt request signals includes initially asserting the interrupt request signals asynchronously with respect to edge transitions of a clock signal applied to all of the slave devices, and in which the interrupt request signals change levels in synchrony with a clock signal applied to all of the slave devices.

18. The method of claim 17 in which transferring the interrupt request signals and the enable signals both include changing a signal level on the single wire from a first level to a second level.

19. The method of claim 18 in which transferring the interrupt request signals comprises changing the signal level on the single wire alternately between the first and second levels, and in which transferring the enable signals comprises changing the signal level on the single wire from the first level to the second level and holding the signal at the second level.

20. The method of claim 17 further comprising holding the clock signal to a first signal level while the interrupt request signal is initially asserted.

* * * * *